C. H. SMOOT.
DYNAMO ELECTRIC MACHINE PROVIDED WITH COMMUTATING POLE PIECES.
APPLICATION FILED SEPT. 5, 1911.
1,114,405.
Patented Oct. 20, 1914.
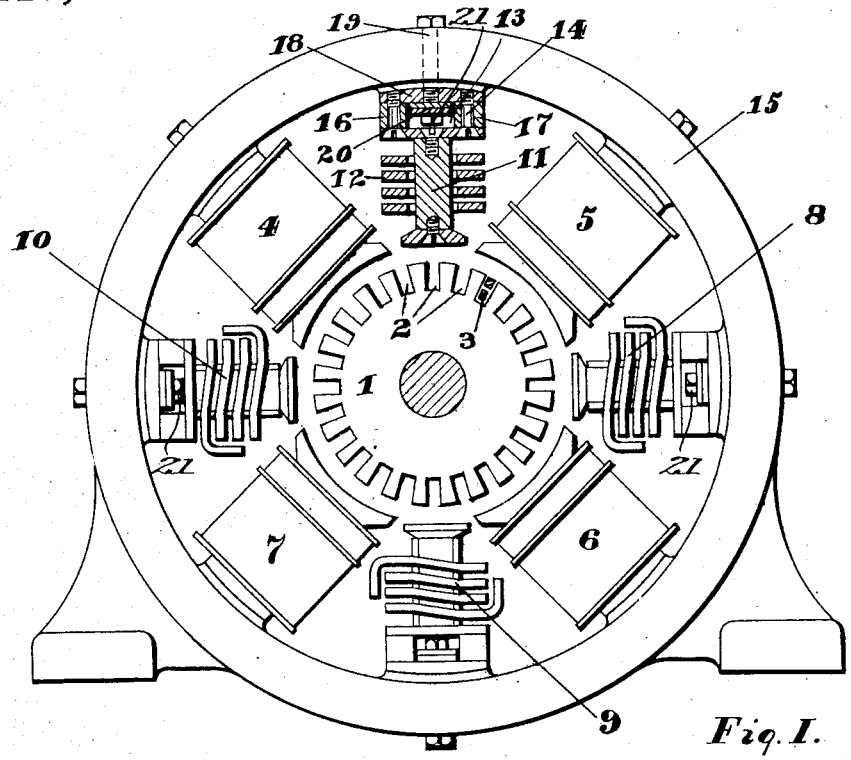
Fig. I.
Fig. II.
WITNESSES:
L. Ballin
C. D. Brooks
C. H. Smoot INVENTOR.

UNITED STATES PATENT OFFICE.

CHARLES HEAD SMOOT, OF HOLLIS, NEW YORK, ASSIGNOR TO RATEAU BATTU SMOOT COMPANY, OF NEW YORK, N. Y.

DYNAMO-ELECTRIC MACHINE PROVIDED WITH COMMUTATING POLE-PIECES.

1,114,405.     Specification of Letters Patent.     Patented Oct. 20, 1914.

Application filed September 5, 1911. Serial No. 647,744.

*To all whom it may concern:*

Be it known that I, CHARLES HEAD SMOOT, a citizen of the United States, residing in Hollis, borough of Queens, county and State of New York, have invented certain new and useful Improvements in Dynamo-Electric Machines Provided with Commutating Pole-Pieces, of which the following is a full, complete, concise, and exact description, reference being had to the accompanying drawing, forming a part of this specification.

The object of my present invention is to provide an improved construction and arrangement of the auxiliary or commutating pole pieces employed in the commutator type of direct or alternating current electrical motors and dynamos, whereby I am enabled to very exactly compensate for the demagnetizing action of the armature, and to communicate to the armature within the commutating zone a magnetic flux which is just sufficient to neutralize the effect of the armature coils, and thereby effect sparkless commutation.

Heretofore it has been usual to adjust the magnetizing effect of a commutating pole piece by adjusting the amount of current passing through the commutating pole winding by the use of a shunt which by passes a certain portion of the current flowing from the armature. This method is not accurate since variations in temperature of the winding and shunt cause relative variations in the resistance of the winding and shunt with the result that it is impossible to keep the fraction of the total current flowing through the winding constant.

In carrying out my invention I form each commutating pole with an air gap, and make provisions for securing the variable amounts of magnetic material in said air gap whereby the magnetic reluctances of the commutating pole piece may be varied. In my apparatus therefore the entire current may always be passed through the commutating pole windings, since desired variations in the magnetic effect of these windings may be obtained by adjusting the magnetic reluctances of the commutating poles.

The various features of novelty which characterize my invention are pointed out with particularity in the claims annexed to and forming a part of this specification; for a better understanding of my invention, however, reference should be had to the accompanying drawings and descriptive matter in which I have illustrated and described a preferred embodiment of my invention.

Of the drawings: Figure 1 is an elevation with parts removed and in section of a dynamo electric machine; and Fig. 2 is a radial section through one of the commutating pole pieces and the field ring of Fig. 1.

In the direct current dynamo shown by the drawings, 1 represents the armature formed with the usual slots 2 to receive the armature conductors 3, of which those filling one only of the slots 2 are shown in the drawings. The main pole pieces 4, 5, 6 and 7 are provided with the usual windings for energizing the main magnetic circuit or circuits of the machine. The commutating pole pieces 8, 9, 10 and 11 which are arranged one between each adjacent pair of main pole pieces are all like. In the construction shown by the drawings the commutating pole pieces each comprises a body portion of magnetic material which is surrounded by an energizing winding 12. The body portion of each commutating pole piece is secured to a plate like piece of magnetic material 18 by the screws 14 formed of non-magnetic material. These screws pass through spacers 16 and 17 of non-magnetic material which separate the pole piece body from the plate 18, which is secured to the magnetic yoke or field ring 15 of the machine by the bolts 19. The spacers 16 and 17 are spaced apart to provide a space 13 in which magnetic plates 20 may be inserted to vary the reluctance of the air gap between the pole piece body and the plate 18. As shown, these plates 20 are clamped against the plate 18 by the bolts 21.

22 represents the insulation material supporting the winding 12.

The pole tip or face 23 of each commutating pole piece is secured to the body of the pole piece by screws 24. With this construction the air gap in each commutating pole piece may be adjusted by the removal of one or both of the gap adjusting plates 20, or the insertion of additional plates, or plates of different thicknesses. Furthermore these plates may be readily changed after the machine is completely assembled and operated so that the air gap in each commutating pole may be adjusted in the manner which the actual operation of the machine shows is necessary to obtain perfect commutation. It will be apparent also that an additional adjustment of the magnetic properties of the commutating pole pieces may be accomplished by the addition or removal of magnetic strips between the pole tips 23 and the bodies of the pole pieces.

Having now described my invention, what I claim as new and desire to secure by Letters Patent is—

1. In a commutating dynamo electric machine, the combination with the armature and the magnetic yoke of the machine, of a commutating pole piece, a winding therefor through which substantially all of the current generated by the machine passes, and means for securing said pole piece to said yoke with an air gap between the pole piece and armature, and with an air gap between the pole piece and yoke, said last mentioned air gap being shaped and disposed to receive laminations of magnetic material whereby the effective length of said air gap may be adjusted.

2. In a commutating dynamo electric machine the combination with the magnetic yoke of the machine and its main polar projections of commutating polar portions interposed between said main polar portion and secured to said yoke, winding surrounding said commutating polar portions, and provisions whereby the magnetic reluctance of said commutating polar portions may be adjusted without disturbing the winding surrounding them.

3. In a commutating dynamo electric machine the combination with the magnetic yoke of the machine of a commutating pole piece attached to said yoke and formed with an air gap and comprising provisions for securing variable amounts of magnetic material in the said air gap whereby the reluctance of the said pole piece may be adjusted.

4. In a commutating dynamo electric machine the combination with the armature, magnetic yoke, and main poles secured to said yoke, of commutating pole pieces separated from said armature by air gaps, non-magnetic means for securing each commutating pole to said yoke with an air gap between the yoke and each commutating pole, means for detachably securing a variable number of plates of magnetic material in the air gaps between the commutating poles and yoke and windings surrounding said commutating poles.

In witness whereof, I hereunto subscribe my name.

CHARLES HEAD SMOOT.

Witnesses:
L. BATTU,
C. D. BROOKS.

---

Copies of this patent may be obtained for five cents each, by addressing the "Commissioner of Patents, Washington, D. C."